US012587098B2

(12) United States Patent (10) Patent No.: US 12,587,098 B2
Wu (45) Date of Patent: Mar. 24, 2026

(54) SYNCHRONOUS COUPLED BOOST CIRCUIT, BOOST CIRCUIT AND POWER SUPPLY APPARATUS

(71) Applicant: THINKING POWER TECHNOLOGY (SHENZHEN) LIMITED, Shenzhen (CN)

(72) Inventor: Zhenyuan Wu, Shenzhen (CN)

(73) Assignee: THINKING POWER TECHNOLOGY (SHENZHEN) LIMITED, Shenzhen (CN)

( * ) Notice: Subject to any disclaimer, the term of this patent is extended or adjusted under 35 U.S.C. 154(b) by 167 days.

(21) Appl. No.: 18/428,279

(22) Filed: Jan. 31, 2024

(65) Prior Publication Data

US 2024/0171079 A1 May 23, 2024

Related U.S. Application Data

(63) Continuation of application No. PCT/CN2022/113504, filed on Aug. 19, 2022.

(30) Foreign Application Priority Data

Aug. 20, 2021 (CN) ......................... 202110964772.7
Sep. 10, 2021 (CN) ......................... 202111067107.4

(51) Int. Cl.
*H02M 3/158* (2006.01)
*H02M 1/088* (2006.01)
(Continued)

(52) U.S. Cl.
CPC ......... *H02M 3/1588* (2013.01); *H02M 1/088* (2013.01); *H02M 1/4225* (2013.01); *H02M 3/1566* (2021.05)

(58) Field of Classification Search
CPC .... H02M 3/1582; H02M 3/156; H02M 3/157; H02M 3/158; H02M 3/1584;
(Continued)

(56) References Cited

U.S. PATENT DOCUMENTS 8,339,817 B2 12/2012 Halberstadt
8,975,884 B2 * 3/2015 Hulsey ................ H02M 3/1584
363/59
(Continued)

FOREIGN PATENT DOCUMENTS

CN 103840646 A 6/2014
CN 106130344 A 11/2016
(Continued)

OTHER PUBLICATIONS

International Search Report and Written Opinion issued in corresponding PCT Application No. PCT/CN2022/113504, dated Nov. 17, 2022.
(Continued)

*Primary Examiner* — Jeffrey A Gblende
(74) *Attorney, Agent, or Firm* — Westbridge IP LLC

(57) ABSTRACT

Disclosed are a synchronous coupled boost circuit, a boost circuit, and a power supply apparatus. In the synchronous coupled boost circuit, the source of the first upper transistor is connected to the non-dotted terminal of the first winding of the coupled inductor and the drain of the first lower transistor, the drain of the first upper transistor is connected to the power output terminal; the source of the second upper transistor is connected to the non-dotted terminal of the second winding of the coupled inductor and the drain of the second lower transistor, the drain of the second upper transistor is connected to the power output terminal; the source of the first lower transistor is grounded; and the source of the second lower transistor is grounded.

19 Claims, 3 Drawing Sheets

(51) Int. Cl.
H02M 1/42 (2007.01)
H02M 3/156 (2006.01)

(58) Field of Classification Search
CPC .............. H02M 3/1586; H02M 3/285; H02M 3/33561; H02M 7/49; H02M 1/045; H02M 7/006; H02M 7/06; H02M 7/068; H02M 7/153; H02M 7/10; H02M 1/083; H02M 7/103; H02M 7/106; H02M 7/19; H02M 7/08; H02M 7/17; H02M 2001/007; H02M 7/493; H02M 7/53806; H02M 7/5381; H02M 7/483; H02M 7/217; H02M 7/538466; H02M 7/5387; H02M 7/53871; H02M 7/53873; H02M 7/53875; H02M 1/084; H02M 1/0845; H02M 1/007; H02M 1/0009; H02M 1/0095; H02M 1/08; H02M 1/088; H02M 3/1588; H02M 7/5395; H02M 1/14; H02M 1/0043; H02M 1/0074; H02M 1/0077; H02M 1/0045; H02M 1/0006; H02J 3/46; H02J 3/38
See application file for complete search history.

(56) References Cited

U.S. PATENT DOCUMENTS

| | | | | |
|---|---|---|---|---|
| 9,300,206 | B2 * | 3/2016 | Ye ........................ | H02M 1/4225 |
| 9,496,788 | B2 * | 11/2016 | Chen ..................... | H02M 3/158 |
| 2008/0012545 | A1 | 1/2008 | Komiya | |
| 2009/0128101 | A1 | 5/2009 | Skinner | |
| 2009/0180305 | A1 * | 7/2009 | Hashino ................ | H01F 27/385 |
| | | | | 363/125 |
| 2013/0235631 | A1 | 9/2013 | Pahlevaninezhad et al. | |
| 2018/0337608 | A1 | 11/2018 | Hari et al. | |
| 2020/0052576 | A1 * | 2/2020 | Murakami .............. | H02M 1/14 |

FOREIGN PATENT DOCUMENTS

| | | | |
|---|---|---|---|
| CN | 107769556 | A | 3/2018 |
| CN | 111541373 | A | 8/2020 |
| CN | 113783426 | A | 12/2021 |
| EP | 3846329 | A1 | 7/2021 |
| JP | 2008306786 | A | 12/2008 |
| JP | 5834768 | B2 | 12/2015 |
| JP | 2020103009 | A | 7/2020 |
| KR | 101554192 | B1 | 9/2015 |
| WO | 2009106014 | A1 | 9/2009 |
| WO | 2020095432 | A1 | 5/2020 |

OTHER PUBLICATIONS

Decision to Grant a Patent issued in counterpart Japanese Patent Application No. JP 2024-508460, dated Feb. 12, 2025.
Office Action issued in counterpart European Patent Application No. EP 22857916.5, dated Feb. 24, 2025.
Alhawari et al., An Efficient Polarity Detection Technique for Thermoelectric Harvester in L-based Converters, IEEE Transactions on Circuits and Systems-I: Regular Papers, vol. 64, No. 3, pp. 705-716, dated Mar. 1, 2017.
Carlson et al., A 20 mV Input Boost Converter With Efficient Digital Control for Thermoelectric Energy Harvesting, IEEE Journal of Solid-State Circuits, vol. 45, No. 4, pp. 741-750, dated Apr. 1, 2010.
Extended European Search Report issued in counterpart European Patent Application No. 22857916.5, dated Sep. 30, 2024.
Pahlevaninezhad et al., A ZVS Interleaved Boost AC/DC Converter Used in Plug-in Electric Vehicles, IEEE Transactions on Power Electronics, vol. 27, No. 8, pp. 3513-3529, dated Aug. 1, 2012.
Sun et al., Adaptive Gate Switching Control for Discontinuous Conduction Mode DC-DC Converter, IEEE Transactions on Power Electronics, vol. 29, No. 3, pp. 1311-1320, dated Mar. 1, 2014.
Hu et al., An Interleaved Bidirectional Coupled-Inductor Based DC-DC Converter With High Conversion Ratio for Energy Storage System, IEEE Transactions on Industrial Electronics, vol. 69, No. 6, pp. 5648-5659, dated Jun. 29, 2021.
Office Action issued in counterpart European Patent Application No. EP 22857916.5, dated Nov. 7, 2025.

* cited by examiner

A • Third Winding — N — First Winding — B

Second Winding — C

VIN

I1

Leff    Lk1    VA    Q1up

I2    Lk2    VB    Q2up    VOUT

Cin    Q1dn    Q2dn    Cout

PGND    PGND    PGND    PGND

SYNCHRONOUS COUPLED BOOST CIRCUIT, BOOST CIRCUIT AND POWER SUPPLY APPARATUS

CROSS-REFERENCE TO RELATED APPLICATIONS

The present application is a continuation application of International Application No. PCT/CN2022/113504, filed on Aug. 19, 2022, which claims priority to Chinese Patent Application No. 202111067107.4, filed on Sep. 10, 2021 and Chinese Patent Application No. 202110964772.7, filed on Aug. 20, 2021, and the entire contents of which are incorporated herein by reference.

TECHNICAL FIELD

The present application relates to the technical field of electronic circuits, and in particular to a synchronous coupled boost circuit, a boost circuit and a power supply apparatus.

BACKGROUND

A boost circuit is the simplest voltage-boosting converter circuit widely used in the field of power electronics. In traditional high-voltage boost circuits, to achieve high efficiency, devices with a small reverse recovery charge (Qrr) are typically used for rectification. This can include rectification alone, using components such as SiC diodes or ultra-fast recovery diodes, or rectification combined with synchronous using components such as GaN FET or SIC FET. Standard Si transistors are generally not used for synchronous rectification due to their large Qrr.

Existing high-voltage boost circuits face several issues, including voltage drop losses in rectification diodes, Qrr losses of body diodes of rectifying transistors, issues with inductor and parasitic capacitance resonance leading to poor power factor (PF) and total harmonic distortion (THD) when the inductor current is discontinuous, and issues with turn-on losses in the bottom-bridge transistors.

SUMMARY

The main purpose of the present application is to propose a synchronous coupled boost circuit, a boost circuit, and a power supply apparatus, aiming to address the aforementioned issues.

To achieve the above-mentioned purpose, the present application presents a synchronous coupled boost circuit. The synchronous coupled boost circuit includes:

a power input terminal and a power output terminal;

a coupled inductor, the coupled inductor includes a first winding and a second winding, and the dotted terminals of the first winding and the second winding are connected as a common terminal, which is connected to the power input terminal;

a first upper transistor, the source of the first upper transistor is connected to the non-dotted terminal of the first winding of the coupled inductor, and the drain of the first upper transistor is connected to the power output terminal;

a first lower transistor, the drain of the first lower transistor is connected to the non-dotted terminal of the first winding of the coupled inductor, and the source of the first lower transistor is grounded;

a second upper transistor, the source of the second upper transistor is connected to the non-dotted terminal of the second winding of the coupled inductor, and the drain of the second upper transistor is connected to the power output terminal; and a second lower transistor, the drain of the second lower transistor is connected to the non-dotted terminal of the second winding of the coupled inductor, and the source of the second lower transistor is grounded.

The first winding, the first upper transistor and the first lower transistor form the first boost branch; and the second winding, the second upper transistor and the second lower transistor form the second boost branch. The first boost branch and the second boost branch operate alternately as the main power circuit.

In an embodiment, when the second boost branch operates as the main power circuit, and a main current is conducted from the source to the drain in the second upper transistor, a switching frequency and turn-on of the first upper transistor are controlled to ensure that the current in the first upper transistor changes from flowing from the source to the drain at the start of conduction to flowing from the drain to the source at the start of turn-off.

In an embodiment, when the first boost branch operates as the main power circuit, the main current is conducted from the source to the drain in the first upper transistor, a switching frequency and turn-on of the second upper transistor are controlled to ensure that the current in the second upper transistor changes from flowing from the source to the drain at the start of conduction to flowing from the drain to the source at the start of turn-off.

In an embodiment, when the second boost branch operates as the main power circuit, a main current is conducted from the drain to the source in the second lower transistor and the second lower transistor remains an on-state, the switching frequency and turn-on of the first lower transistor are controlled to ensure that the current in the first lower transistor changes from flowing from the source to the drain at the start of conduction to flowing from the drain to the source at the start of turn-off.

In an embodiment, when the first boost branch operates as the main power circuit, the main current is conducted from the drain to the source in the first lower transistor and the first lower transistor remains an on-state, the switching frequency and turn-on of the second lower transistor are controlled to ensure that the current in the second lower transistor changes from flowing from the source to the drain at the start of conduction to flowing from the drain to the source at the start of turn-off.

In an embodiment, switching frequencies of the first lower transistor and the second lower transistor are controlled to ensure that a dropping value fluctuation range of an input ripple current in the coupled inductor does not exceed 50%.

In an embodiment, the switching frequencies of the first lower transistor and the second lower transistor are controlled to ensure that an absolute difference value between a maximum value and a minimum value of a dropping value of the input ripple current in the coupled inductor does not exceed 5 A.

In an embodiment, the switching frequency of the first lower transistor is controlled to ensure that the switching frequency is not less than the preset frequency value; and the switching frequency of the second lower transistor is controlled to ensure that the switching frequency is not less than the preset frequency value.

In an embodiment, the coupled inductor further includes a third winding, which is inserted between the power input terminal and the common terminal. The dotted terminal of the third winding is connected to the power input terminal, and the non-dotted terminal of the third winding is connected to the common terminal of the first winding and the second winding.

In an embodiment, the synchronous coupled boost circuit further includes a third inductor, which is inserted between the power input terminal and the common terminal. The input terminal of the third inductor is connected to the power input terminal, and the output terminal of the third inductor is connected to the common terminal of the first winding and the second winding.

In an embodiment, the first winding of the coupled inductor of the synchronous coupled boost circuit is replaced with a first inductor, and the second winding is replaced with a second inductor.

In an embodiment, the first winding and the second winding are on the same magnetic core and have the same number of turns and the same winding method.

In an embodiment, both the first winding and the second winding are wound on the same magnetic core using multistrand twisted wires.

In an embodiment, both the first winding and the second winding have multiple coil cakes composed of multi-strand twisted wires, and the multiple coil cakes of the first winding and the multiple coil cakes of the second winding are alternately wound on the same magnetic core.

In an embodiment, a sampling resistor is connected in series in the ground return path through which the current flows in the coupled inductor. The synchronous coupled boost circuit further includes an operational amplifier, which amplifies the voltage of the sampling resistor in a differential manner, and the unity-gain bandwidth of the operational amplifier is not less than 20 MHz.

In an embodiment, a sampling resistor is connected in series between the sources of the first lower transistor and the second lower transistor and ground. The synchronous coupled boost circuit further includes an operational amplifier, which amplifies the voltage of the sampling resistor in a differential manner, and the unity-gain bandwidth of the operational amplifier is not less than 20 MHz.

In an embodiment, a current transformer is connected in series between the non-dotted terminal of the first winding of the coupled inductor and the drain of the first lower transistor; and a current transformer is connected in series between the non-dotted terminal of the second winding of the coupled inductor and the drain of the second lower transistor.

In an embodiment, a current transformer is connected in series between the non-dotted terminal of the first winding of the coupled inductor and the source of the first upper transistor; and a current transformer is connected in series between the non-dotted terminal of the second winding of the coupled inductor and the source of the second upper transistor.

In an embodiment, a power input voltage of the synchronous coupled boost circuit is set as Vin and a power output voltage of the synchronous coupled boost circuit is set as Vout; switching frequencies of the first lower transistor and the second lower transistor are controlled to vary with the power input voltage Vin with a maximum value between 3Vout/10 and 7Vout/10.

In an embodiment, the power input voltage of the synchronous coupled boost circuit is set as Vin and the power output voltage of the synchronous coupled boost circuit is set as Vout. The switching frequency of the first lower transistor is controlled to vary with the power input voltage Vin, and gradually decreases towards two sides from a center point, where the center point is any value within the range of 3Vout/10 to 7Vout/10.

The switching frequency of the second lower transistor is controlled to vary with the input voltage Vin, and gradually decreases towards two sides from a center point, where the center point is any value within the range of 3Vout/10 to 7Vout/10.

In an embodiment, the power input voltage of the synchronous coupled boost circuit is set as Vin and the power output voltage of the synchronous coupled boost circuit is set as Vout. When the power supply input voltage is greater than any preset voltage value in the range of 3Vout/10 to 7Vout/10, the switching frequency of the first lower transistor is controlled to continuously decrease as the power input voltage increases and continuously increase as the power input voltage decreases.

When the power input voltage is greater than any preset voltage value in the range of 3Vout/10 to 7Vout/10, the switching frequency of the second lower transistor is controlled to continuously decrease as the power input voltage increases and continuously increase as the power input voltage decreases.

In an embodiment, the power input voltage of the synchronous coupled boost circuit is set as Vin and the power output voltage of the synchronous coupled boost circuit is set as Vout. When the power input voltage is less than any preset voltage value in the range of 3Vout/10 to 7Vout/10, the switching frequency of the first lower transistor is controlled to continuously increase as the power input voltage increases and continuously decrease as the power input voltage decreases.

When the power input voltage is less than any preset voltage value in the range of 3Vout/10 to 7Vout/10, the switching frequency of the second lower transistor is controlled to continuously increase as the power input voltage increases and continuously decrease as the power input voltage decreases.

In an embodiment, before the first boost branch starts operating as the main power circuit, and when the current in the first upper transistor is negative, the first upper transistor is turned off before the second upper transistor is turned off. After the first upper transistor is turned off for a dead time, the first lower transistor is turned on.

Before the second boost branch starts operating as the main power circuit, and when the current in the second upper transistor is negative, the second upper transistor is turned off before the first upper transistor is turned off. After the second upper transistor is turned off for a dead time, the second lower transistor is turned on.

In an embodiment, when the first boost branch operates as the main power circuit, the second lower transistor is turned on after the first lower transistor is turned on; and when the second boost branch operates as the main power circuit, the first lower transistor is turned on after the second lower transistor is turned on.

In an embodiment, when the first boost branch operates as the main power circuit, the first lower transistor is controlled to operate for a preset duration and is turned off no earlier than the time when the second lower transistor is turned off; and when the second boost branch operates as the main power circuit, the second lower transistor is controlled to operate for a preset duration and is turned off no earlier than the time when the first lower transistor is turned off.

In an embodiment, when the first boost branch operates as the main power circuit, the first upper transistor is turned on before the second upper transistor after the first lower transistor is turned off; and when the second boost branch operates as the main power circuit, the second upper transistor is turned on before the first upper transistor after the second lower transistor is turned off.

In an embodiment, when the first boost branch and the second boost branch operate alternately as the main power circuit, during the first half of a control cycle, the first boost branch operates as the main power circuit, the operation timing of the transistors is as follows:

at the first moment, the first upper transistor is turned off;

at the second moment, the first lower transistor is turned on;

at the third moment, the second upper transistor is turned off;

at the fourth moment, the first lower transistor is turned off;

at the fifth moment, the first upper transistor is turned on; and at the sixth moment, the second upper transistor is turned on.

During the second half of a control cycle, the second boost branch operates as the main power circuit, the operation timing of the transistors is as follows:

at the seventh moment, the second upper transistor is turned off;

at the eighth moment, the second lower transistor is turned on;

at the ninth moment, the first upper transistor is turned off;

at the tenth moment, the second lower transistor is turned off;

at the eleventh moment, the second upper transistor is turned on; and at the twelfth moment, the first upper transistor is turned on.

The present application further proposes a boost circuit, which includes:

a power input terminal and a power output terminal;

an inductor, the input terminal of the inductor is connected to the power input terminal;

a diode, the anode of the diode is connected to the output terminal of the inductor and the cathode of the diode is connected to the power output terminal; and a transistor, the drain of the transistor is connected to the output terminal of the inductor and the source of the transistor is grounded.

When the inductor current is in a continuous conduction mode and the input voltage continuously changes, the change of the switching frequency of the transistor is controlled based on the principle of reducing more switching losses at the cost of a small increase in magnetic losses.

In an embodiment, the power input voltage of the boost circuit is set as Vin and the power output voltage of the boost circuit is set as Vout. The switching frequency of the transistor is controlled to vary with the power input voltage Vin, and gradually decreases towards two sides from a center point, where the center point is any value within the range of 3Vout/10 to 7Vout/10.

In an embodiment, when the switching frequency of the transistor is controlled, the switching frequency is not less than a preset frequency value.

In an embodiment, the power input voltage of the boost circuit is set as Vin and the power output voltage of the boost circuit is set as Vout. When the switching frequency of the transistor is controlled, if the power input voltage is greater than any preset voltage value in the range of 3Vout/10 to 7Vout/10, the switching frequency continuously decreases as the voltage increases and continuously increases as the voltage decreases.

In an embodiment, when the switching frequency of the transistor is controlled, the switching frequency is not less than a preset frequency value.

In an embodiment, the power input voltage of the boost circuit is set as Vin and the power output voltage of the boost circuit is set as Vout. When the switching frequency of the transistor is controlled, if the power input voltage is less than any preset voltage value in the range of 3Vout/10 to 7Vout/10, the switching frequency continuously increases as the voltage increases and continuously decreases as the voltage decreases.

In an embodiment, when the switching frequency of the transistor is controlled, the switching frequency is not less than a preset frequency value.

The present application also proposes a power supply apparatus, which includes the aforementioned synchronous coupled boost circuit or the aforementioned boost circuit.

The present application solves various issues in traditional rectification circuits by controlling the charging and discharging timing of the first boost branch composed of the first winding of the coupled inductor, the first upper transistor and the first lower transistor, as well as the charging and discharging timing of the second boost branch composed of the second winding of the coupled inductor, the second upper transistor and the second lower transistor. These issues include voltage drop losses in traditional rectifier diodes, Qrr losses of the body diode of the rectifying transistors, poor power factor (PF) and total harmonic distortion (THD) caused by resonance of the inductance and the parasitic capacitance in the discontinuous current of the traditional PFC inductor, as well as losses due to the turn-on of the first lower transistor and the second lower transistor.

BRIEF DESCRIPTION OF THE DRAWINGS

In order to provide a clearer illustration of the embodiments of the present application or the technical solutions in the related art, a brief introduction of the drawings required in the description of the embodiments or related art is provided below. It is evident that the drawings described below are merely some embodiments of the present application, and for those skilled in the art, other drawings can be obtained without creative efforts based on the structures shown in these drawings.

Figure 1:
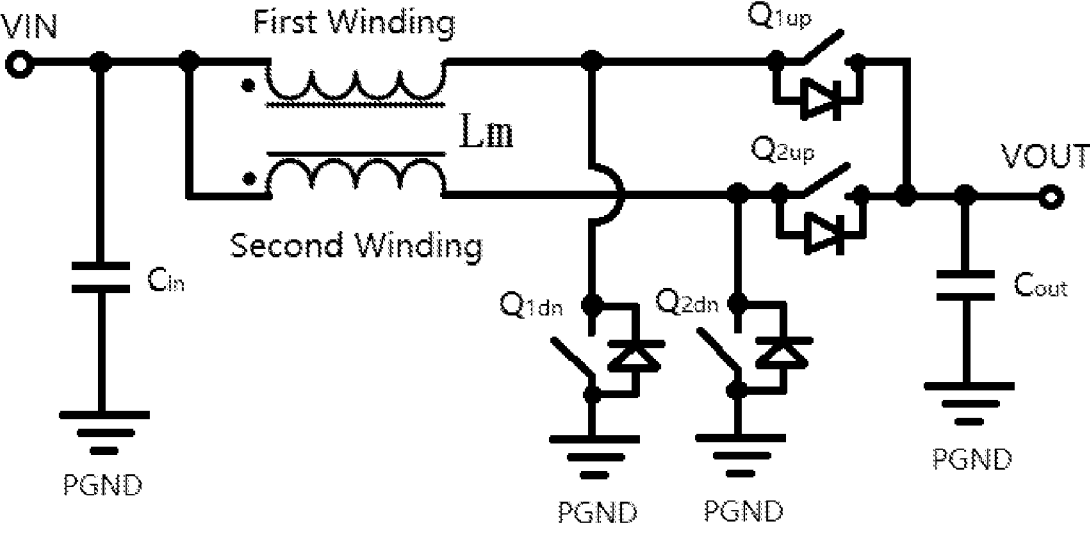
FIG. 1 is a schematic diagram of a circuit structure of a synchronous coupled boost circuit according to an embodiment of the present application.
Figure 2:
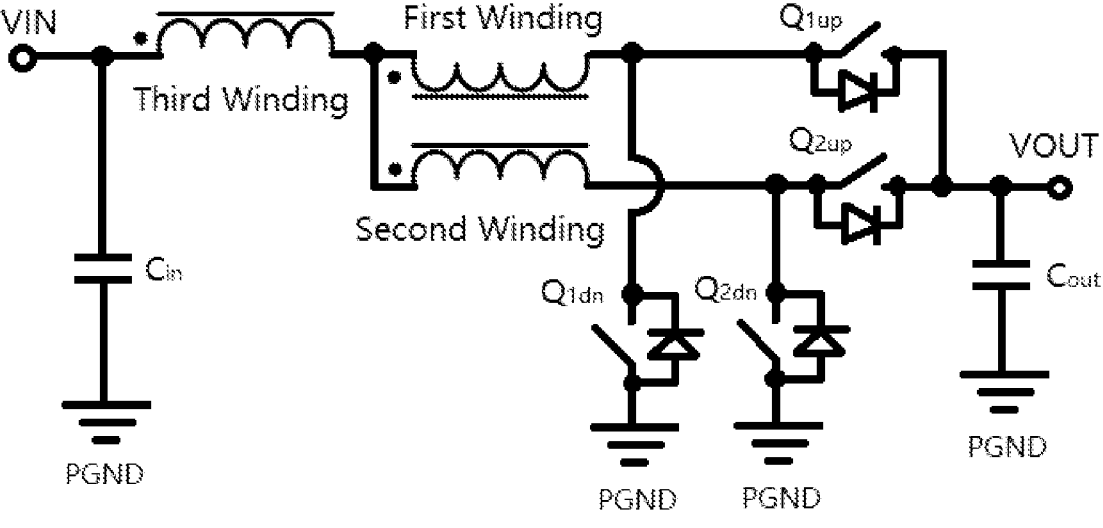
FIG. 2 is a schematic diagram of the circuit structure of the synchronous coupled boost circuit according to another embodiment of the present application.

The realization of the purpose, functional features and advantages of the present application will be further explained in conjunction with embodiments and with reference to the accompanying drawings.

DETAILED DESCRIPTION OF THE EMBODIMENTS

The following will provide a clear and comprehensive description of the technical solutions in the embodiments of the present application, in conjunction with the accompanying drawings. It is evident that the described embodiments are only some rather than all the embodiments of the present application. Based on the embodiments of the present application, all other embodiments that those skilled in the art can obtain without creative efforts fall within the scope of the present application.

It should be noted that if directional indications (such as up, down, left, right, front, back, etc.) are mentioned in the embodiments of the present application, these directional indications are only used to explain the relative positional relationships and movements of various components in a specific posture (as shown in the drawings). When this specific posture changes, the directional indications change accordingly.

Furthermore, if descriptions such as "first", "second" etc., are used in the embodiments of the present application, these descriptions are used for descriptive purposes and should not be construed as indicating or implying the relative importance or implicitly indicating the quantity of the technical features indicated. Thus, features defined as "first", "second," etc., can explicitly or implicitly include at least one of that feature. Additionally, the technical solutions between various embodiments can be combined, but must be based on what those skilled in the art can achieve. When the combination of technical solutions contradicts or cannot be realized, it should be considered that the combination of these technical solutions does not exist and is not within the scope of the present application.

The term "and/or" in this text is merely a way to describe the correlation between related objects, indicating that there can be three relationships. For example, A and/or B can represent the following three situations: A exists alone, A and B exist simultaneously, and B exists alone. Additionally, the character "/" in this text generally denotes an "or" relationship between the related objects.

The present application proposes a synchronous coupled boost circuit. Referring to FIGS. 1 to 4, in an embodiment of the present application, the synchronous coupled boost circuit includes a power input terminal VIN and a power output terminal VOUT, a coupled inductor Lm, a first upper transistor $Q_{1up}$, a first lower transistor $Q_{1dn}$, a second upper transistor $Q_{2up}$ and a second lower transistor $Q_{2dn}$.

The coupled inductor Lm includes a first winding and a second winding, and the dotted terminals of the first winding and the second winding are connected together as a common terminal.

The source of the first upper transistor $Q_{1up}$ is connected to the non-dotted terminal of the first winding of the coupled inductor Lm, and the drain of the first upper transistor $Q_{1up}$ is connected to the power output terminal VOUT.

The drain of the first lower transistor $Q_{1dn}$ is connected to the non-dotted terminal of the first winding of the coupled inductor Lm, and the source of the first lower transistor $Q_{1dn}$ is grounded.

The source of the second upper transistor $Q_{2up}$ is connected to the non-dotted terminal of the second winding of the coupled inductor Lm, and the drain of the second upper transistor $Q_{2up}$ is connected to the power output terminal VOUT.

The drain of the second lower transistor $Q_{2dn}$ is connected to the non-dotted terminal of the second winding of the coupled inductor Lm, and the source of the second lower transistor $Q_{2dn}$ is grounded.

The first lower transistor $Q_{1dn}$ and the second lower transistor $Q_{2dn}$ can be implemented using GaN FET or transistors with body diodes such as IGBT, MOSFET, SiC FET etc., while the first upper transistor $Q_{1up}$ and the second upper transistor $Q_{2up}$ can be implemented using GaN FET or transistors with body diodes such as MOSFET, SiC FET, etc. GaN FET could conduct current from source to drain as if there were a body diode. The behavior by body diode conduction from source to drain also applies to the conduction of GaN FET from source to drain.

Figures 3, 4:
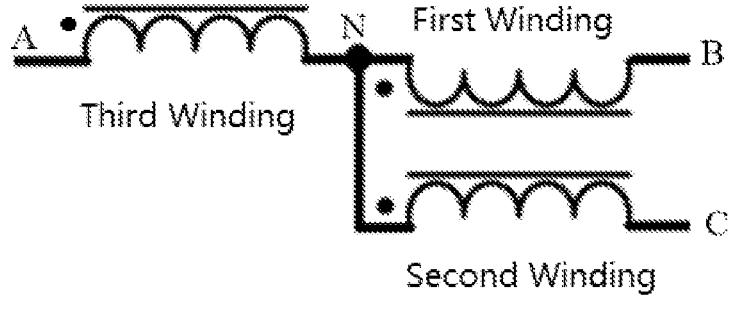
FIG. 3 is a schematic diagram of the circuit structure of a coupled inductor according to an embodiment.
FIG. 4 is a schematic diagram of the equivalent circuit structure of the synchronous coupled boost circuit according to an embodiment in FIG. 1 or FIG. 2.

In this embodiment, the common terminal of the first winding and the second winding is connected to the power input terminal VIN. In FIG. 4, Leff is the equivalent self-inductance of the coupled inductor Lm, and Lk1 and Lk2 are the leakage inductances of the first and second windings of the coupled inductor Lm.

In this embodiment, the first winding of the coupled inductor Lm, the first upper transistor $Q_{1up}$, and the first lower transistor $Q_{1dn}$ form the first boost branch. The second winding of the coupled inductor Lm, the second upper transistor $Q_{2up}$, and the second lower transistor $Q_{2dn}$ form the second boost branch.

The first boost branch and the second boost branch operate alternately as the main power circuit. Specifically, when the first boost branch serves as the main power circuit, the first winding carries the main current. When the first lower transistor $Q_{1dn}$ is turned on, energy is stored in the coupled inductor Lm through the first winding. After a dead time when the first lower transistor $Q_{1dn}$ is turned off, the first upper transistor $Q_{1up}$ conducts, and the current in the coupled inductor Lm flows through the first winding and the first upper transistor $Q_{1up}$ and is output to the power output terminal VOUT, thereby achieving voltage boosting.

When the second boost branch serves as the main power circuit, the second winding carries the main current. When the second lower transistor $Q_{2dn}$ is turned on, energy is stored in the coupled inductor Lm through the second winding. After a dead time when the second lower transistor $Q_{2dn}$ is turned off, the second upper transistor $Q_{2up}$ conducts, and the current in the coupled inductor Lm flows through the second winding and the second upper transistor $Q_{2up}$ and is output to the power output terminal VOUT, thereby achieving voltage boosting.

In an embodiment, when the second boost branch operates as the main power circuit, and a main current is conducted from the source to the drain in the second upper transistor, a switching frequency and turn-on of the first upper transistor are controlled to ensure that the current in the first upper transistor changes from flowing from the source to the drain at the start of conduction to flowing from the drain to the source at the start of turn-off.

When the second boost branch serves as the main power circuit, the second upper transistor conducts the main current, and the first upper transistor $Q_{1up}$ is just turned on, the current in the first upper transistor $Q_{1up}$ mainly consists of the resonant current of the leakage inductance and the parasitic capacitance at the VA node, its value depends on Vout, the value of the leakage inductance, and the capacitance of the parasitic capacitance. Compared to the main current, this current is very small.

Because the voltage Vin at the power input terminal VIN is lower than the voltage Vout at the power output terminal VOUT, and assuming that the values of the leakage inductances Lk1 and Lk2 are approximately the same, the currents through the leakage inductances Lk1 and Lk2 will decrease at approximately the same rate. Since the initial current (mainly resonant current) in the leakage inductance Lk1 and the first upper transistor $Q_{1up}$ is relatively small, with sufficient current fluctuations, the current I1 on the first boost branch will gradually become negative. This negative current is then used for the soft turn-on of the first lower transistor $Q_{1dn}$ in the next stage.

In an embodiment, when the first boost branch operates as the main power circuit, the main current is conducted from the source to the drain in the first upper transistor, a switching frequency and turn-on of the second upper transistor are controlled to ensure that the current in the second upper transistor changes from flowing from the source to the drain at the start of conduction to flowing from the drain to the source at the start of turn-off.

When the first boost branch serves as the main power circuit, the first upper transistor conducts the main current, and the second upper transistor $Q_{2up}$ is just turned on, the current in the second upper transistor $Q_{2up}$ is mainly the resonant current of the leakage inductance and parasitic capacitance at the VB node. Its value depends on Vout, the value of the leakage inductance and the capacitance of the parasitic capacitance. Compared to the main current, it is very small. Because the voltage Vin at the power input terminal VIN is smaller than the voltage Vout at the power output terminal VOUT, assuming that the values of the leakage inductances Lk1 and Lk2 are approximately the same, the currents through the leakage inductances Lk1 and Lk2 will decrease at approximately the same rate. Since the initial current in leakage inductance Lk2 and the second upper transistor $Q_{2up}$ (mainly resonant current) is relatively small, with sufficient current fluctuations, the current I2 in the second boost branch will gradually become negative. This negative current is then used for the soft turn-on of the second lower transistor $Q_{2dn}$ in the next stage.

In an embodiment, when the second boost branch operates as the main power circuit, a main current is conducted from the drain to the source in the second lower transistor and the second lower transistor remains an on-state, the switching frequency and turn-on of the first lower transistor are controlled to ensure that the current in the first lower transistor changes from flowing from the source to the drain at the start of conduction to flowing from the drain to the source at the start of turn-off.

In this embodiment, when the current in the first lower transistor flows from the drain to the source and the first lower transistor is turned off, the voltage at the VA node will be charged up by this current before the second lower transistor is turned off, so that the initial conduction current in the first upper transistor by the resonant current at the VA node will be minimized. Minimized initial conduction current will result in a more negative current when the first upper transistor is turned off.

In an embodiment, when the first boost branch operates as the main power circuit, the main current is conducted from the drain to the source in the first lower transistor and the first lower transistor remains an on-state, the switching frequency and turn-on of the second lower transistor are controlled to ensure that the current in the second lower transistor changes from flowing from the source to the drain at the start of conduction to flowing from the drain to the source at the start of turn-off.

In this embodiment, when the current in the second lower transistor flows from the drain to the source and the second lower transistor is turned off, the voltage at the VB node will be charged up by this current before the first lower transistor is turned off, so that the initial conduction current in the second upper transistor by the resonant current at the VB node will be minimized. Minimized initial conduction current will result in a more negative current when the second upper transistor is turned off.

In an embodiment, switching frequencies of the first lower transistor and the second lower transistor are controlled to ensure that a dropping value fluctuation range of an input ripple current in the coupled inductor does not exceed 50%.

In an embodiment, the switching frequencies of the first lower transistor and the second lower transistor are controlled to ensure that an absolute difference value between a maximum value and a minimum value of a dropping value of the input ripple current in the coupled inductor does not exceed 5 A.

After the ripple current reduction value is basically stable, it is possible to have precise negative current and precise resonant energy when turning off the first upper transistor before the first boost branch starts working as the main power circuit. Therefore, there is precise timing control when the first lower transistor is soft turned on, minimizing the turn-on losses of the first lower transistor.

After the ripple current reduction value is basically stable, it is possible to have precise negative current and precise resonant energy when turning off the second upper transistor before the second boost branch starts working as the main power circuit. Therefore, there is precise timing control when the second lower transistor is soft turned on, minimizing the turn-on losses of the second lower transistor.

In an embodiment, the switching frequency of the first lower transistor is controlled to ensure that the switching frequency is not less than the preset frequency value. Similarly, the switching frequency of the second lower transistor is controlled to ensure that the switching frequency is not less than the preset frequency value. By controlling the minimum value of the switching frequency, it is possible to prevent audio noise and ensure that the system does not respond too slowly.

Referring to FIG. 3, in this embodiment, the coupled inductor further includes a third winding, which is inserted between the power input terminal and the common terminal. The dotted terminal of the third winding is connected to the power input terminal, and the non-dotted terminal of the third winding is connected to the common terminal of the first winding and the second winding. In this embodiment, Leff in FIG. 4 is the equivalent self-inductance of the coupled inductor Lm with the third winding, and Lk1 and Lk2 are the leakage inductances of the first and second windings of the coupled inductor Lm.

When winding the first winding, second winding and third winding, the following method can be used: starting from point A and winding for P turns in one direction to form an independent winding, namely, the third winding AN, then starting from point N and wind in the same direction for Q turns to form another independent winding, namely, the first winding NB, and finally starting from point N again and wind in the same direction for Q turns to form another independent winding, namely, the second winding NC. The coils of these three windings are arranged in a reasonable space to obtain suitable leakage inductances for the first winding and the second winding (i.e., leakage inductances Lk1 and Lk2).

In an embodiment, the synchronous coupled boost circuit further includes a third inductor, which is inserted between the power input terminal and the common terminal. The input terminal of the third inductor is connected to the power input terminal, and the output terminal of the third inductor is connected to the common terminal of the first winding and the second winding. In this embodiment, Leff in FIG. 4 is the inductance value of the third inductor plus the equivalent self-inductance of the coupled inductor Lm, Lk1 and Lk2 are the leakage inductances of the first winding and the second winding of the coupled inductor Lm, respectively.

In an embodiment, the first winding of the coupled inductor in the synchronous coupled boost circuit is replaced by the first inductor, and the second winding is replaced by the second inductor. The input terminal of the third inductor is connected to the power input terminal, and the output terminal of the third inductor is connected to the input terminals of the first inductor and the second inductor. The output terminal of the first inductor is connected to the source of the first upper transistor, and the output terminal of the second inductor is connected to the source of the second upper transistor. In this embodiment, Leff in FIG. 4 is the inductance value of the third inductor, Lk1 and Lk2 are the inductance values of the first inductor and the second inductor, respectively.

In an embodiment, the first winding and the second winding are wound on the same magnetic core, and they have the same number of turns and winding method. Having the same number of turns and winding method for the first winding and the second winding can ensure symmetry and equal leakage inductance of the first winding and the second winding.

In an embodiment, both the first winding and the second winding are wound using multi-strand twisted wire on the same magnetic core. The transition rate when the current flows from the first winding to the second winding or from the second winding to the first winding is determined by Lk1, Lk2 and the output voltage. When Lk1 and Lk2 are very small, the transition rate is fast, and both the first winding and the second winding have large high-frequency components. Using multi-strand twisted wire can minimize high-frequency losses in both the first winding and the second winding.

In another embodiment, to further reduce high-frequency losses in the windings, both the first winding and the second winding have multiple coil cakes composed of multi-strand twisted wires. The multiple coil cakes of the first winding and the second winding are alternately wound on the same magnetic core.

In an embodiment, a sampling resistor is connected in series in the ground loop through which current of the coupled inductor flows. The synchronous coupled boost circuit further includes an operational amplifier, which amplifies the voltage across the sampling resistor in a differential manner. In this embodiment, the operational amplifier has a unity-gain bandwidth of no less than 20 MHz. With this configuration, the sampling resistor can always represent the current in the coupled inductor at any time, and the voltage across the sampling resistor, after differential amplification by the high-speed operational amplifier, can be read by the controller.

In an embodiment, a sampling resistor is connected in series between the sources of the first lower transistor and the second lower transistor and ground. The synchronous coupled boost circuit further includes an operational amplifier, which amplifies the voltage across the sampling resistor in a differential manner. In this embodiment, the operational amplifier has a unity-gain bandwidth of no less than 20 MHz.

With this configuration, the sampling resistor can represent the current in the coupled inductor only when both the first and second lower transistors conduct. The voltage across the sampling resistor, after differential amplification by the high-speed operational amplifier, can then be read by the controller.

In an embodiment, a current transformer is connected in series between the non-dotted terminal of the first winding of the coupled inductor and the drain of the first lower transistor. Similarly, a current transformer is connected in series between the non-dotted terminal of the second winding of the coupled inductor and the drain of the second lower transistor.

In an embodiment, a current transformer is connected in series between the non-dotted terminal of the first winding of the coupled inductor and the source of the first upper transistor, and a current transformer is connected in series between the non-dotted terminal of the second winding of the coupled inductor and the source of the second upper transistor.

In the above embodiments, using current transformers to obtain the current values for the windings of the coupled inductor or the total current offers advantages such as primary-secondary isolation and faster frequency response, despite the relatively larger size of the current transformers.

In an embodiment, a power input voltage of the synchronous coupled boost circuit is set as Vin and a power output voltage of the synchronous coupled boost circuit is set as Vout; switching frequencies of the first lower transistor and the second lower transistor are controlled to vary with the power input voltage Vin with a maximum value between 3Vout/10 and 7Vout/10.

In an embodiment, with reference to FIGS. 1 to 5, the power voltage at the power input terminal VIN of the synchronous coupled boost circuit is set as Vin and the power output voltage of the synchronous coupled boost circuit is set as Vout, the switching frequency of the first lower transistor is controlled to vary with the power input voltage Vin, and gradually decreases towards two sides from a center point, where the center point is any value within the range of 3Vout/10 to 7Vout/10. The switching frequency of the second lower transistor is controlled to vary with the power input voltage Vin, and gradually decreases towards two sides from a center point, where the center point is any value within the range of 3Vout/10 to 7Vout/10.

In another embodiment, the power input voltage of the synchronous coupled boost circuit is set as Vin and the power output voltage of the synchronous coupled boost circuit is set as Vout. When the power input voltage is greater than any preset voltage value within the range of 3Vout/10 to 7Vout/10, the switching frequency of the first lower transistor is controlled such that the switching frequency decreases continuously as the power input voltage increases and increases continuously as the power input voltage decreases.

When the power input voltage is greater than any preset voltage value within the range of 3Vout/10 to 7Vout/10, the switching frequency of the second lower transistor is controlled such that the switching frequency decreases continuously as the power input voltage increases and increases continuously as the power input voltage decreases.

In another embodiment, the power input voltage of the synchronous coupled boost circuit is set as Vin and the power output voltage of the synchronous coupled boost circuit is set as Vout. When the power supply input voltage is less than any preset voltage value in the range of 3Vout/10 to 7Vout/10, the switching frequency of the first lower transistor is controlled to continuously increase as the power input voltage increases and continuously decrease as the power input voltage decreases.

When the power input voltage is less than any preset voltage value within the range of 3Vout/10 to 7Vout/10, the switching frequency of the second lower transistor is controlled to continuously increase as the power input voltage increases and continuously decrease as the power input voltage decreases.

In an embodiment, the first boost branch and the second boost branch operate alternately as the main power circuit, and only one branch serves as the main power branch at any given time. For the magnetic flux changes in the coupled inductor, under the condition where the parameters of the first branch and the second branch are the same, it can be considered that the same branch is working. The following analysis is based on the equivalent case of one branch.

In this embodiment, considering magnetic balance in the coupled inductor, the switching duty cycle D of the synchronous coupled boost circuit can be represented using the following formula (1):

$$D = \frac{Vout - Vin}{Vout} \qquad (1)$$

The magnitude of the ripple current Iripple corresponding to the magnetic flux variation in the coupled inductor can be represented using the following formula (2) (neglecting Lk1 and Lk2, since they are very small compared to Leff):

$$Iripple = \frac{Vin * D * T}{Leff} \qquad (2)$$

Substituting the duty cycle calculated from formula (1) into formula (2), we can obtain:

$$Iripple = \frac{Vin * (Vout - Vin) * T}{Vout * Leff} \qquad (3)$$

Where Vin is the real-time voltage applied to the power input terminal VIN, Vout is the output voltage, Leff is the equivalent self-inductance of the coupled inductor Lm, and T is the equivalent switching period when the first lower transistor $Q_{1dn}$ and the second lower transistor $Q_{2dn}$ are considered as a single entity.

According to the above calculation formula, it can be obtained that when Vin is in the range of 3Vout/10 to 7Vout/10, the ripple current reaches the vertex range of a parabola, with the maximum occurring at $$Vin = \frac{Vout}{2}.$$

The ripple current varies with the input voltage Vin applied to the power input terminal VIN, with $$Vin = \frac{Vout}{2}$$

as the center, gradually decreasing from the center to both sides. In power factor correction (PFC), when Vin is far away from Vout/2, the ripple current is very small. At this time, it is possible to moderately reduce the switching frequency to increase the ripple current, that is, reduce more switching losses at the cost of slightly increase in magnetic losses. This can be achieved by appropriately changing the switching frequency of the first lower transistor $Q_{1dn}$ and the second lower transistor $Q_{2dn}$. For example, as the input power voltage gradually increases to Vout/2, the switching frequency of the first lower transistor $Q_{1dn}$ and the second lower transistor $Q_{2dn}$ gradually increase at a certain rate until the input power voltage reaches Vout/2 after which the switching frequency gradually decreases again. In this embodiment, switching losses are also reflected in the magnetic switching losses when large current switches from leakage inductance Lk1 (leakage inductance Lk2) to leakage inductance Lk2 (leakage inductance Lk1). Compared to critical conduction mode (CrCM) of traditional PFC, the ripple current Iripple increases with the increase of Vin. The present application ensures that Iripple remains constant or within a certain range by actively changing the switching frequency of the first lower transistor $Q_{1dn}$ and the second lower transistor $Q_{2dn}$.

In an embodiment, as shown in FIG. 1 to FIG. 5, before the first boost branch starts operating as the main power circuit and when the current in the first upper transistor $Q_{1up}$ is negative, the first upper transistor $Q_{1up}$ is controlled to be turned off before the second upper transistor $Q_{2up}$ is turned off. After a dead time when the first upper transistor $Q_{1up}$ is turned off, the first lower transistor $Q_{1dn}$ is controlled to be turned on.

Before the second boost branch starts operating as the main power circuit and when the current in the second upper transistor $Q_{2up}$ is negative, the second upper transistor $Q_{2up}$ is controlled to be turned off before the first upper transistor $Q_{1up}$ is turned off. After a dead time when the second upper transistor $Q_{2up}$ is turned off, the second lower transistor $Q_{2dn}$ is controlled to be turned on.

Before the first boost branch starts operating as the main power circuit, the first upper transistor $Q_{1up}$ is in a conductive state, and the current in the first winding I1 is negative. The leakage inductance Lk1 and the first upper transistor $Q_{1up}$ are in the same path. When the first upper transistor $Q_{1up}$ is turned off, the VA point discharges through the current I1, causing the voltage at the VA point to gradually decrease. With sufficient energy in Lk1 leakage inductance, the body diode of the first lower transistor $Q_{1dn}$ conducts, clamping the drain-source voltage VDS of the first lower transistor $Q_{1dn}$. At this point, turning on the first lower transistor $Q_{1dn}$ allows for complete soft turn-on.

Before the second boost branch starts operating as the main power circuit, the second upper transistor $Q_{2up}$ is in the conductive state, and the current in the second winding I2 is negative. The leakage inductance Lk2 and the second upper transistor $Q_{2up}$ are in the same path. When the second upper transistor $Q_{2up}$ is turned off, the VB point discharges through the current I2, causing the voltage at the VB point to gradually decrease. With sufficient energy in Lk2 leakage inductance, the body diode of the second lower transistor $Q_{2dn}$ conducts, clamping the drain-source voltage VDS of the second lower transistor $Q_{2dn}$. At this point, turning on the second lower transistor $Q_{2dn}$ allows for complete soft turn-on.

At the moment when the first upper transistor $Q_{1up}$ (or the second upper transistor $Q_{2up}$) is turned off, the negative current from the leakage inductance Lk1 discharges through the VA point (or the negative current from the leakage inductance Lk2 discharges through the VB point), initiating resonance. When the VA point (or VB point) cannot drop to zero voltage, and the leakage inductance energy is used up, the voltage at the VA point (or VB point) is at its lowest. At this point, turning on the first lower transistor $Q_{1dn}$ (or the second lower transistor $Q_{2dn}$) results in the minimum loss, which is also known as partial soft turn-on.

After the first lower transistor $Q_{1dn}$ (or the second lower transistor $Q_{2dn}$) is turned on, because Lk1 and Lk2 are very small compared to Leff, the effect of Leff on the rate of change of current in the second upper transistor $Q_{2up}$ (or the first upper transistor $Q_{1up}$) can be neglected. When the current in the second upper transistor $Q_{2up}$ (or the first upper transistor $Q_{1up}$) is greater than 0, the current decreases at a rate of Vout/(Lk1+Lk2). Because the leakage inductance limits the rate of change of current in the second upper transistor $Q_{2up}$ (or the first upper transistor $Q_{1up}$), it can greatly reduce the Qrr losses by the body diodes of these transistors. This circuit structure is simple, requires no additional auxiliary devices or circuits, and does not need complex control methods. It only uses a magnetic component and four transistors to achieve soft-switching characteristics of the transistors and their body diodes, which improves the efficiency of the converter. This is advantageous for high-frequency and high-power-density designs.

In traditional boost circuits that use rectifier diodes, when the boost inductor current decreases to zero, due to the cutoff of the diode, the boost inductor resonates with parasitic capacitance at its terminals. At this point, the current undergoes nonlinear changes and enters an uncontrolled state, resulting in very poor power factor (PF) and total harmonic distortion (THD) values for power factor correction (PFC).

In an embodiment, referring to FIG. 1 to FIG. 5, with the controllable conductivity of the rectifier transistors, the rectifier transistors can achieve bidirectional conduction of current. Both the first upper transistor $Q_{1up}$ and the second upper transistor $Q_{2up}$ are not in perfect synchronization during rectification; instead, they allow negative current in both the first upper transistor $Q_{1up}$ and the second upper transistor $Q_{2up}$. This allows the boost circuit to maintain continuous linear current and avoids the LC resonance issue that arises when traditional diode rectifiers cannot handle negative current. When the first boost branch operates as the main power branch, both the first upper transistor $Q_{1up}$ and the second upper transistor $Q_{2up}$ remain on, even if the current inside the transistors drops below zero, until the first upper transistor $Q_{1up}$ is turned off. When the second boost branch operates as the main power branch, both the first upper transistor $Q_{1up}$ and the second upper transistor $Q_{2up}$ remain on, even if the current inside the transistors drops below zero, until the second upper transistor is turned off. After the first lower transistor $Q_{1dn}$ or the second lower transistor $Q_{2dn}$ is turned on, the current in the coupled inductor continuously increases linearly, without generating LC resonance. In summary, the current in the coupled inductor remains in a linear and continuous state and is fully controllable, effectively improving the PF and THD values of PFC.

Figures 5, 6:
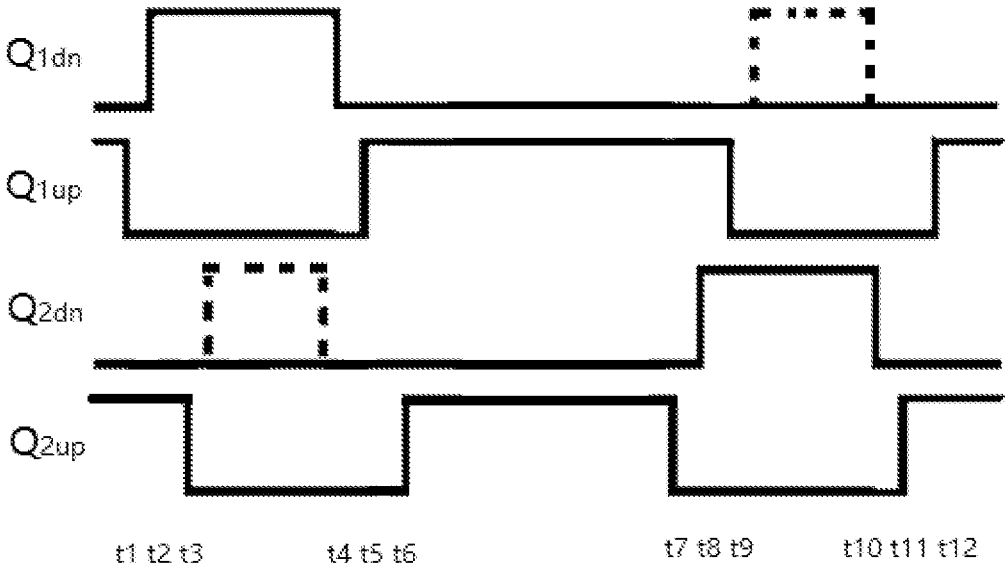
FIG. 5 is a timing control diagram for the switches in the synchronous coupled boost circuit according to the present application.
FIG. 6 is a schematic diagram of the circuit structure of a boost circuit according to an embodiment of the present application.

In an embodiment, referring to FIG. 1 to FIG. 5, as shown in the dashed line in FIG. 5, when the first boost branch operates as the main power circuit, the second lower transistor is controlled to be turned on after the first lower transistor is turned on.

When the second boost branch operates as the main power circuit, the first lower transistor is controlled to be turned on after the second lower transistor is turned on.

When the first boost branch serves as the main power circuit, and the first lower transistor $Q_{1dn}$ is in the conductive state, the voltage at the VB point will eventually be clamped by the body diode due to resonance. At this moment, the second lower transistor $Q_{2dn}$ is turned on, and the second lower transistor $Q_{2dn}$ is turned off in time before the first lower transistor $Q_{1dn}$ is turned off.

When the second boost branch serves as the main power circuit, and the second lower transistor $Q_{2dn}$ is in the conductive state, the voltage at the VA point will eventually be clamped by the body diode due to resonance. At this moment, the first lower transistor $Q_{1dn}$ is turned on, and the first lower transistor $Q_{1dn}$ is turned off in time before the second lower transistor $Q_{2dn}$ is turned off.

In an embodiment, referring to FIG. 1 to FIG. 5, when the first boost branch operates as the main power circuit, the first lower transistor is controlled to operate for a preset duration and is turned off no earlier than the time when the second lower transistor is turned off. The first lower transistor is turned off no earlier than the time when the second lower transistor is turned off, which can guarantee that the main current flows through the first lower transistor. After the first lower transistor is turned off, only a limited current flows through the second upper transistor when the first upper transistor is turned on.

When the second boost branch operates as the main power circuit, the second lower transistor is controlled to operate for a preset duration and is turned off no earlier than the time when the first lower transistor is turned off. The second lower transistor is turned off no earlier than the time when the first lower transistor is turned off, which can guarantee that the main current flows through the second lower transistor. After the second lower transistor is turned off, only a limited current flows through the first upper transistor when the second upper transistor is turned on.

In an embodiment, referring to FIG. 1 to FIG. 5, when the first boost branch operates as the main power circuit, the first upper transistor is turned on before the second upper transistor after the first lower transistor is turned off.

When the second boost branch operates as the main power circuit, the second upper transistor is turned on before the first upper transistor after the second lower transistor is turned off.

After the first lower transistor $Q_{1dn}$ is turned off, the current of the first winding charges the VA point, eventually causing the voltage at the VA point to be greater than the voltage at the VOUT point. At this moment, the body diode of the first upper transistor $Q_{1up}$ becomes conductive, and the first upper transistor $Q_{1up}$ is turned on.

During the process of increasing the voltage at the VA point, the voltage at the VB point also rises with the increase of the voltage at the VA point due to the resonance of the leakage inductance, but lags in time behind VA point. Eventually, the voltage at the VB point is greater than the voltage at the VOUT point, causing the body diode of the second upper transistor $Q_{2up}$ to become conductive, and at this moment the second upper transistor $Q_{2up}$ is turned on.

The turn-on of the first upper transistor $Q_{1up}$ and the second upper transistor $Q_{2up}$ allows for resistance losses of the transistors to replace the voltage drop losses of diodes. Choosing transistors with very low resistance values can minimize losses in this scenario.

After the second lower transistor $Q_{2dn}$ is turned off, the current of the second winding charges the VB point, eventually causing the voltage at the VB point to be greater than the voltage at the VOUT point. At this moment, the body diode of the second upper transistor $Q_{2up}$ becomes conductive, and the second upper transistor $Q_{2up}$ is turned on.

During the process of increasing the voltage at the VB point, the voltage at the VA point also rises with the increase of the voltage at the VB point due to the resonance of the leakage inductance, but lags in time behind VB point. Eventually, the voltage at the VA point is greater than the voltage at the VOUT point, causing the body diode of the first upper transistor $Q_{1up}$ to become conductive, and at this moment the first upper transistor $Q_{1up}$ is turned on.

The turn-on of the first upper transistor $Q_{1up}$ and the second upper transistor $Q_{2up}$ allows for resistance losses of the transistors to replace the voltage drop losses of diodes. Choosing transistors with very low resistance values can minimize losses in this scenario.

Referring to FIG. 5, which illustrates the timing control diagram for the various switches in both the first boost branch and the second boost branch, in an embodiment, when the first boost branch and the second boost branch operate alternately as the main power circuit, during the first half of a control cycle, the first boost branch operates as the main power circuit, the operation timing of the transistors is as follows:

Before the first moment t1, the leakage inductance Lk1 and the first upper transistor $Q_{1up}$ are in the same path, and the current I1 is negative.

At the first moment t1, the first upper transistor $Q_{1up}$ is turned off, and the negative current I1 discharges the VA point. The voltage at the VA point will continuously decrease.

At the second moment t2, the voltage at the VA point reaches its lowest point, and the first lower transistor $Q_{1dn}$ conducts. At this moment, the first lower transistor $Q_{1dn}$ is turned on with minimum losses.

At the third moment t3, the second upper transistor $Q_{2up}$ is turned off. If the current through the second upper transistor $Q_{2up}$ before being turned off is positive, the current starts to flow from the second upper transistor $Q_{2up}$ to its body diode. The current on Lk2 decreases at a certain rate, eventually reaching zero, and the body diode of the second upper transistor $Q_{2up}$ is softly turned off. This minimizes the losses caused by the reverse recovery charge of the body diode of the second upper transistor $Q_{2up}$, thereby addressing the Qrr losses issue of the body diodes of the rectifying transistors. Subsequently, Lk2 and the parasitic capacitance at the VB point resonate, ultimately the voltage at the VB point is clamped by the body diode of the second lower transistor $Q_{2dn}$.

If the current through the second upper transistor $Q_{2up}$ before being turned off is negative, the voltage at VB point immediately resonant and is eventually clamped by the body diode of $Q_{2dn}$. This results in minimal Qrr loss in the body diode of the rectifying transistor.

Once the voltage at VB point is clamped, the current on Lk2 changes from negative to zero. By controlling a reasonable ripple current and ensuring that it is greater than the resonant current due to leakage inductance and parasitic capacitance, the Lk2 current can oscillate near zero and gradually return to zero.

At the fourth moment t4, the current on the equivalent self-inductance Leff has completed its rise, and at this point, the first lower transistor $Q_{1dn}$ is turned off. As the first lower transistor $Q_{1dn}$ is turned off, the coupled inductor Lm charges the VA point through the first winding, causing the voltage at the VA point to rise. Due to the increase in the voltage at the VA point and the resonance between the leakage inductance Lk1, leakage inductance Lk2 and the parasitic capacitance at the VB point, the voltage at the VB point will also continuously increases.

At the fifth moment t5, the voltage at the VA point exceeds Vout, causing the body diode of the first upper transistor $Q_{1up}$ to conduct, and at this moment, the first upper transistor $Q_{1up}$ is softly turned on.

At the sixth moment t6, the voltage at the VB point eventually also exceeds Vout, causing the body diode of the second upper transistor $Q_{2up}$ to conduct, and at this moment, the second upper transistor $Q_{2up}$ is softly turned on.

The current in the second upper transistor $Q_{2up}$ mainly consists of the resonant current from the leakage inductance and the parasitic capacitance at the VB point. The value of this current depends on Vout, the value of the leakage inductance and the capacitance of the parasitic capacitance and is relatively small compared to the main current.

During the period from the soft turn-on of the second upper transistor $Q_{2up}$ to its turn-off (from the sixth moment t6 to the seventh moment t7), because the voltage Vin at the power input terminal VIN is smaller than the voltage Vout at the power output terminal VOUT, when the values of leakage inductances Lk1 and Lk2 are the same or basically the same, the currents in leakage inductances Lk1 and Lk2 will decrease at the same or basically the same rate. As the initial current in the path of leakage inductance Lk2 and the second upper transistor $Q_{2up}$ (mainly the resonant current) is relatively small, the current I2 in the second boost branch will gradually become negative. This negative current is then used for the soft turn-on of the second lower transistor $Q_{2dn}$ in the next stage.

During the second half of one control cycle, when the second boost branch operates as the main power circuit, the operation timing of the transistors is as follows:

Before the seventh moment t7, the leakage inductance Lk2 and the second upper transistor $Q_{2up}$ are in the same path, and the current I2 is negative.

At the seventh moment t7, the second upper transistor $Q_{2up}$ is turned off, and the negative current I2 discharges the VB point. The voltage at the VB point will continuously decrease.

At the eighth moment t8, the voltage at the VB point reaches the lowest point, and the second lower transistor $Q_{2dn}$ conducts. At this moment, the second lower transistor $Q_{2dn}$ is turned on with minimal losses.

At the ninth moment t9, the first upper transistor $Q_{1up}$ is turned off. If the current through the first upper transistor $Q_{1up}$ before being turned off is positive, the current starts to flow from the first upper transistor $Q_{1up}$ to its body diode. The current on Lk1 decreases at a certain rate, eventually reaching zero, and the body diode of the first upper transistor $Q_{1up}$ is softly turned off. This minimizes the losses caused by the reverse recovery charge of the body diode of the first upper transistor $C_{1up}$, thereby addressing the Qrr losses issue in the body diodes of the rectifying transistors. Subsequently, Lk1 and the parasitic capacitance at the VA point resonate, eventually the voltage at the VA point is clamped by the body diode of $Q_{1dn}$.

If the current through the first upper transistor $Q_{1up}$ before being turned off is negative, VA point immediately undergoes resonance and is eventually clamped by the body diode of $Q_{1dn}$. This results in minimal Qrr loss in the body diode of the rectifying transistor.

Once the voltage at the VA point is clamped, the current on Lk1 changes from negative to zero. By controlling a reasonable ripple current and ensuring that it is greater than the resonant current due to leakage inductance and parasitic capacitance, the Lk1 current can oscillate near zero and gradually return to zero.

At the tenth moment t10, the current on the equivalent self-inductance Leff has completed its rise, and at this moment, the second lower transistor $Q_{2dn}$ is turned off. As the second lower transistor $Q_{2dn}$ is turned off, the coupled inductor Lm charges the VB point through the second winding, causing the voltage at the VB point to rise. Due to the increase in the voltage at the VB point and the resonance between the leakage inductance Lk1, leakage inductance Lk2 and the parasitic capacitance at the VA point, the voltage at the VA point also continuously increase.

At the eleventh moment t11, the voltage at the VB point exceeds Vout, causing the body diode of the second upper transistor $Q_{2up}$ to conduct, and at this moment, the second upper transistor $Q_{2up}$ is softly turned on.

At the twelfth moment t12, the voltage at the VA point eventually also exceeds Vout, causing the body diode of the first upper transistor $Q_{1up}$ to conduct, and at this moment, the first upper transistor $Q_{1up}$ is softly turned on.

The current in the first upper transistor $Q_{1up}$ mainly consists of the resonant current from the leakage inductance and the parasitic capacitance at the VA point. The value of this current depends on Vout, the value of the leakage inductance and the capacitance of the parasitic capacitance and is relatively small compared to the main current.

During the period from the soft turn-on of the first upper transistor $Q^{1up}$ to its turn-off (from the twelfth moment t12 to the first moment t1), because the voltage Vin at the power input terminal VIN is smaller than the voltage Vout at the power output terminal VOUT, when the values of leakage inductances Lk1 and Lk2 are roughly the same, the currents in Lk1 and Lk2 will decrease at roughly the same rate. As the initial current in the path of leakage inductance Lk1 and the first upper transistor $Q^{1up}$ (mainly the resonant current) is relatively small, the current I1 in the first boost branch will gradually become negative. This negative current is then used for the soft turn-on of the first lower transistor $Q_{1dn}$ in the next stage.

In an embodiment, as shown in FIG. 1 to FIG. 4, the synchronous coupled boost circuit operates in synchronous parallel mode. The first boost branch and the second boost branch operate as parallel branches, working in synchronization to share the current.

When the first upper transistor $Q_{1up}$ and the second upper transistor $Q_{2up}$ use transistors with very small Qrr such as GaN FET or SiC FET (but not limited to these), they can simultaneously be turned on and off. Similarly, the first lower transistor $Q_{1dn}$ and the second lower transistor $Q_{2dn}$ can also simultaneously be turned on and off. In this mode, it operates as if two traditional boost circuits are in parallel. In this mode, the windings of the coupled inductor Lm are fully utilized, resulting in a reduction in inductance resistance losses. This mode differs from traditional boost circuits in that the first lower transistor and the second lower transistor $Q_{2dn}$ are isolated by leakage inductance and are independently turned on when turned on, without parallel oscillation of the first lower transistor $Q_{1dn}$ and the second lower transistor $Q_{2dn}$. Similarly, the first upper transistor $Q_{1up}$ and the second upper transistor $Q_{2up}$ are also isolated by the leakage inductance and do not produce parallel oscillations.

The present application addresses various issues in power conversion by controlling the charging and discharging timing of the first boost branch and the second boost branch, the first boost branch is formed by the first winding of the coupled inductor, the first upper transistor $Q_{1up}$ and the first lower transistor $Q_{1dn}$, and the second boost branch is formed by the second winding of the coupled inductor, the second upper transistor $Q_{2up}$ and the second lower transistor $Q_{2dn}$. These issues include voltage drop losses in rectifying diodes, Qrr losses by the body diodes of rectifying transistors, poor PF and THD caused by discontinuous inductor current and parasitic capacitance oscillations, and turn-on losses in the lower bridge transistors (the first lower transistor $Q_{1dn}$ and the second lower transistor $Q_{2dn}$).

The present application also proposes a power supply apparatus that includes the synchronous coupled boost circuit as described above.

The power supply apparatus includes the synchronous coupled boost circuit as described above. The detailed structure of the synchronous coupled boost circuit can be understood by referring to the previous embodiments, and will not be repeated here. It can be understood that since the synchronous coupled boost circuit described above is used in the power supply apparatus in the present application, the embodiments of the power supply apparatus in the present application encompass all the technical solutions of the embodiments of the synchronous coupled boost circuit described above and achieve the same technical effects, and are not repeated here.

The present application also presents a boost circuit, referring to FIG. 6, the boost circuit includes: a power input terminal VIN and a power output terminal VOUT, a inductor L1, a diode D1 and a transistor Q1.

The input terminal of the inductor L1 is connected to the power input terminal VIN.

The anode of the diode D1 is connected to the output terminal of the inductor L1 and the cathode of the diode D1 is connected to the power output terminal VOUT.

The drain of the transistor Q1 is connected to the output terminal of the inductor L1 and the source of the transistor Q1 is grounded.

In cases where the inductor current is in a continuous mode and the input voltage is continuously changing, the change of the switching frequency of the transistor is controlled based on the principle of reducing more switching losses at the cost of a slight increase in magnetic losses.

In an embodiment, the boost circuit is configured with a power input voltage of Vin, a power output voltage of Vout, and an inductance value of L1 (Leff). When controlling the switching frequency of the transistor Q1, the switching frequency is set to follow changes in the power input voltage Vin, and gradually decreases from the center to sides, with the center being any value within the range of 3Vout/10 to 7Vout/10. In an embodiment, when controlling the switching frequency of the transistor Q1, the switching frequency is not less than a preset frequency value.

In another embodiment, the boost circuit is configured with a power input voltage of Vin and a power output voltage of Vout. When controlling the switching frequency of the transistor, the switching frequency continuously decreases with increasing voltage and continuously increases with decreasing voltage when the power input voltage is greater than any preset voltage value within the range of 3Vout/10 to 7Vout/10. In an embodiment, when controlling the switching frequency of the transistor, the switching frequency is not less than a preset frequency value.

In another embodiment, the boost circuit is configured with a power input voltage of Vin and a power output voltage of Vout. When controlling the switching frequency of the transistor, the switching frequency continuously increases with increasing voltage and continuously decreases with decreasing voltage when the power input voltage is less than any preset voltage value within the range of 3Vout/10 to 7Vout/10. In an embodiment, when controlling the switching frequency of the transistor, the switching frequency is not less than a preset frequency value.

In an embodiment, when the inductor current is in the continuous mode, considering magnetic balance of the inductor, the switching duty cycle D of the boost circuit can be represented using the following formula (4):

$$D = \frac{Vout - Vin}{Vout} \qquad (4)$$

The magnitude of the ripple current Iripple can be represented using the following formula (5):

$$Iripple = \frac{Vin * D * T}{Leff} \qquad (5)$$

By substituting the duty cycle calculated using formula (4) into formula (5), you can obtain:

$$Iripple = \frac{Vin * (Vout - Vin) * T}{Vout * Leff} \qquad (6)$$

Where Vin represents the input voltage at the power input terminal VIN, Vout represents the output voltage at the power output terminal VOUT, Leff represents the inductance value of the inductor L1, and T represents the switching period of the transistor Q1.

Based on the calculations mentioned above, when Vin is in the range of 3Vout/10 to 7Vout/10, the ripple current reaches the vertex range of the parabola, with the maximum occurring at Vout/2. The ripple current varies with the input voltage Vin at the power input terminal VIN, and with Vout/2 as the center, continuously decreases from the center to both sides. In PFC, when Vin is far away from Vout/2, the ripple current is minimal. During this time, it is possible to moderately reduce the switching frequency while moderately increasing the ripple current, that is, reduce more switching losses at the cost of a small increase in magnetic losses.

This can be achieved by moderately changing the switching frequency of transistor Q1. For example, as the input power voltage gradually increases to Vout/2, the switching frequency of the transistor Q1 gradually increases at a certain rate until the input power voltage reaches Vout/2, after which the switching frequency of the transistor Q1 gradually decreases. Compared to the CrCM of traditional PFC, the ripple current Iripple increases with increasing Vin, the present application can ensure that Iripple remains constant or within a certain range by actively changing the switching frequency of transistor Q1.

The present application also presents a power apparatus, including the boost circuit as described above.

The power supply apparatus includes the aforementioned boost circuit. The detailed structure of the boost circuit can refer to the above-mentioned embodiments, and will not be elaborated here. It is understood that since the boost circuit described above is used in the power supply apparatus of the present application, the embodiments of the power supply apparatus of the present application include all the technical solutions of the embodiments of the boost circuit described above, achieve the same technical effects, and will not be repeated here.

The above description is only optional embodiments of the present application and does not limit the scope of the present application. Under the inventive concept of the present application, any equivalent structural changes made using the contents of the description and drawings of the present application, or direct/indirect application in other related technical fields, are all included in the scope of the present application.

What is claimed is:

1. A synchronous coupled boost circuit, comprising:
a power input terminal and a power output terminal;
a coupled inductor, comprising a first winding and a second winding, wherein dotted terminals of the first winding and the second winding are connected together as a common terminal, and the common terminal; the first winding and the second winding are on a same magnetic core and have a same number of turns is connected to the power input terminal;
a first upper transistor, wherein a source of the first upper transistor is connected to a non-dotted terminal of the first winding of the coupled inductor, and a drain of the first upper transistor is connected to the power output terminal;
a first lower transistor, wherein a drain of the first lower transistor is connected to the non-dotted terminal of the first winding of the coupled inductor, and a source of the first lower transistor is grounded;
a second upper transistor, wherein a source of the second upper transistor is connected to a non-dotted terminal of the second winding of the coupled inductor, and a drain of the second upper transistor is connected to the power output terminal; and
a second lower transistor, wherein a drain of the second lower transistor is connected to the non-dotted terminal of the second winding of the coupled inductor, and a source of the second lower transistor is grounded;
wherein the first winding, the first upper transistor and the first lower transistor form a first boost branch;
the second winding, the second upper transistor and the second lower transistor form a second boost branch;
the first boost branch and the second boost branch operate alternately as a main power circuit;
when the first boost branch operates as the main power circuit, the second lower transistor is turned on after the first lower transistor is turned on; and
when the second boost branch operates as the main power circuit, the first lower transistor is turned on after the second lower transistor is turned on;
when the second boost branch operates as the main power circuit, and a main current is conducted from the source to the drain in the second upper transistor, a switching frequency and turn-on of the first upper transistor are controlled to ensure that the current in the first upper transistor changes from flowing from the source to the drain at the start of conduction to flowing from the drain to the source at the start of turn-off; and
when the first boost branch operates as the main power circuit, the main current is conducted from the source to the drain in the first upper transistor, a switching frequency and turn-on of the second upper transistor are controlled to ensure that the current in the second upper transistor changes from flowing from the source to the drain at the start of conduction to flowing from the drain to the source at the start of turn-off.

2. The synchronous coupled boost circuit of claim 1, wherein switching frequencies of the first lower transistor and the second lower transistor are controlled to ensure that a dropping value fluctuation range of an input ripple current in the coupled inductor does not exceed 50%; or, the switching frequencies of the first lower transistor and the second lower transistor are controlled to ensure that an absolute difference value between a maximum value and a minimum value of a dropping value of the input ripple current in the coupled inductor does not exceed 5 A.

3. The synchronous coupled boost circuit of claim 1, wherein a switching frequency of the first lower transistor is controlled to ensure that the switching frequency is not less than a preset frequency value; and a switching frequency of the second lower transistor is controlled to ensure that the switching frequency is not less than the preset frequency value.

4. The synchronous coupled boost circuit of claim 1, wherein the coupled inductor further comprises a third winding, the third winding is inserted between the power input terminal and the common terminal, a dotted terminal of the third winding is connected to the power input terminal, and a non-dotted terminal of the third winding is connected to the common terminal of the first winding and the second winding.

5. The synchronous coupled boost circuit of claim 1, further comprising a third inductor, wherein the third inductor is inserted between the power input terminal and the common terminal, an input terminal of the third inductor is connected to the power input terminal, and an output terminal of the third inductor is connected to the common terminal of the first winding and the second winding.

6. The synchronous coupled boost circuit of claim 5, wherein the first winding of the coupled inductor is replaced with a first inductor, and the second winding is replaced with a second inductor.

7. The synchronous coupled boost circuit of claim 1, wherein a power input voltage of the synchronous coupled boost circuit is set as Vin and a power output voltage of the synchronous coupled boost circuit is set as Vout; switching frequencies of the first lower transistor and the second lower transistor are controlled to vary with the power input voltage Vin with a maximum value between 3Vout/10 and 7Vout/10.

8. The synchronous coupled boost circuit of claim 1, wherein a power input voltage of the synchronous coupled boost circuit is set as Vin and a power output voltage of the synchronous coupled boost circuit is set as Vout; a switching frequency of the first lower transistor is controlled to vary with the power input voltage Vin, and gradually decreases towards two sides from a center point, where the center point is any value within a range of 3Vout/10 to 7Vout/10; and a switching frequency of the second lower transistor is controlled to vary with the input voltage Vin, and gradually decreases towards two sides from a center point, where the center point is any value within the range of 3Vout/10 to 7Vout/10.

9. The synchronous coupled boost circuit of claim 1, wherein before the first boost branch starts operating as the main power circuit, and when the current in the first upper transistor is negative, the first upper transistor is turned off before the second upper transistor is turned off; after the first upper transistor is turned off for a dead-time, the first lower transistor is turned on; and before the second boost branch starts operating as the main power circuit, and when the current in the second upper transistor is negative, the second upper transistor is turned off before the first upper transistor is turned off; after the second upper transistor is turned off for a dead-time, the second lower transistor is turned on.

10. The synchronous coupled boost circuit of claim 1, wherein when the first boost branch operates as the main power circuit, the first lower transistor is controlled to operate for a preset duration and is turned off no earlier than a time when the second lower transistor is turned off; and when the second boost branch operates as the main power circuit, the second lower transistor is controlled to operate for a preset duration and is turned off no earlier than a time when the first lower transistor is turned off.

11. The synchronous coupled boost circuit of claim 1, wherein when the first boost branch operates as the main power circuit, the first upper transistor is turned on before the second upper transistor after the first lower transistor is turned off; and when the second boost branch operates as the main power circuit, the second upper transistor is turned on before the first upper transistor after the second lower transistor is turned off.

12. The synchronous coupled boost circuit of claim 1, wherein when the first boost branch and the second boost branch operate alternately as the main power circuit, during a first half of a control cycle, the first boost branch operates as the main power circuit, operation timing of the transistors is as follows:

at a first moment, the first upper transistor is turned off;

at a second moment, the first lower transistor is turned on;

at a third moment, the second upper transistor is turned off;

at a fourth moment, the first lower transistor is turned off;

at a fifth moment, the first upper transistor is turned on; and at a sixth moment, the second upper transistor is turned on, and during a second half of the control cycle, the second boost branch operates as the main power circuit, operation timing of the transistors is as follows:

at a seventh moment, the second upper transistor is turned off;

at an eighth moment, the second lower transistor is turned on;

at a ninth moment, the first upper transistor is turned off;

at a tenth moment, the second lower transistor is turned off;

at an eleventh moment, the second upper transistor is turned on; and at a twelfth moment, the first upper transistor is turned on.

13. A power supply apparatus, comprising the synchronous coupled boost circuit of claim 1.

14. A synchronous coupled boost circuit, comprising:

a power input terminal and a power output terminal;

a coupled inductor, comprising a first winding and a second winding, wherein dotted terminals of the first winding and the second winding are connected together as a common terminal, and the common terminal; the first winding and the second winding are on a same magnetic core and have a same number of turns is connected to the power input terminal;

a first upper transistor, wherein a source of the first upper transistor is connected to a non-dotted terminal of the first winding of the coupled inductor, and a drain of the first upper transistor is connected to the power output terminal;

a first lower transistor, wherein a drain of the first lower transistor is connected to the non-dotted terminal of the first winding of the coupled inductor, and a source of the first lower transistor is grounded;

a second upper transistor, wherein a source of the second upper transistor is connected to a non-dotted terminal of the second winding of the coupled inductor, and a drain of the second upper transistor is connected to the power output terminal; and a second lower transistor, wherein a drain of the second lower transistor is connected to the non-dotted terminal of the second winding of the coupled inductor, and a source of the second lower transistor is grounded;

wherein the first winding, the first upper transistor and the first lower transistor form a first boost branch;

the second winding, the second upper transistor and the second lower transistor form a second boost branch;

the first boost branch and the second boost branch operate alternately as a main power circuit;

when the first boost branch operates as the main power circuit, the second lower transistor is turned on after the first lower tansistor is turned on; and when the second boost branch operates as the main power circuit, the first lower transistor is turned on after the second lower transistor is turned on;

when the second boost branch operates as the main power circuit, a main current is conducted from the drain to the source in the second lower transistor and the second lower transistor remains an on-state, a switching frequency and turn-on of the first lower transistor are controlled to ensure that the current in the first lower transistor changes from flowing from the source to the drain at the start of conduction to flowing from the drain to the source at the start of turn-off; and when the first boost branch operates as the main power circuit, the main current is conducted from the drain to the source in the first lower transistor and the first lower transistor remains an on-state, a switching frequency and turn-on of the second lower transistor are controlled to ensure that the current in the second lower transistor changes from flowing from the source to the drain at the start of conduction to flowing from the drain to the source at the start of turn-off.

15. The synchronous coupled boost circuit of claim 14, wherein a power input voltage of the synchronous coupled boost circuit is set as Vin and a power output voltage of the synchronous coupled boost circuit is set as Vout; and switching frequencies of the first lower transistor and the second lower transistor are controlled to vary with the power input voltage Vin with a maximum value between 3Vout/10 and 7Vout/10.

16. The synchronous coupled boost circuit of claim 14, wherein a power input voltage of the synchronous coupled boost circuit is set as Vin and a power output voltage of the synchronous coupled boost circuit is set as Vout; a switching frequency of the first lower transistor is controlled to vary with the power input voltage Vin, and gradually decreases towards two sides from a center point, where the center point is any value within a range of 3Vout/10 to 7Vout/10; and a switching frequency of the second lower transistor is controlled to vary with the input voltage Vin, and gradually decreases towards two sides from a center point, where the center point is any value within the range of 3Vout/10 to 7Vout/10.

17. The synchronous coupled boost circuit of claim 14, wherein when the first boost branch operates as the main power circuit, the first lower transistor is controlled to operate for a preset duration and is turned off no earlier than a time when the second lower transistor is turned off; and when the second boost branch operates as the main power circuit, the second lower transistor is controlled to operate for a preset duration and is turned off no earlier than a time when the first lower transistor is turned off.

18. A power supply apparatus, comprising the synchronous coupled boost circuit of claim 14.

19. A synchronous coupled boost circuit, comprising:

a power input terminal and a power output terminal;

a coupled inductor, comprising a first winding and a second winding, wherein dotted terminals of the first winding and the second winding are connected together as a common terminal, and the common terminal; the first winding and the second winding are on a same magnetic core and have a same number of turns is connected to the power input terminal;

a first upper transistor, wherein a source of the first upper transistor is connected to a non-dotted terminal of the first winding of the coupled inductor, and a drain of the first upper transistor is connected to the power output terminal;

a first lower transistor, wherein a drain of the first lower transistor is connected to the non-dotted terminal of the first winding of the coupled inductor, and a source of the first lower transistor is grounded;

a second upper transistor, wherein a source of the second upper transistor is connected to a non-dotted terminal of the second winding of the coupled inductor, and a drain of the second upper transistor is connected to the power output terminal; and a second lower transistor, wherein a drain of the second lower transistor is connected to the non-dotted terminal of the second winding of the coupled inductor, and a source of the second lower transistor is grounded;

wherein the first winding, the first upper transistor and the first lower transistor form a first boost branch;

the second winding, the second upper transistor and the second lower transistor form a second boost branch;

the first boost branch and the second boost branch operate alternately as a main power circuit;

when the first boost branch operates as the main power circuit, the second lower transistor is turned on after the first lower transistor is turned on; and when the second boost branch operates as the main power circuit, the first lower transistor is turned on after the second lower transistor is turned on;

switching frequencies of the first lower transistor and the second lower transistor are controlled to ensure that a dropping value fluctuation range of an input ripple current in the coupled inductor does not exceed 50%; or, the switching frequencies of the first lower transistor and the second lower transistor are controlled to ensure that an absolute difference value between a maximum value and a minimum value of a dropping value of the input ripple current in the coupled inductor does not exceed 5 A.

* * * * *